United States Patent
Roy

(10) Patent No.: US 11,710,180 B2
(45) Date of Patent: Jul. 25, 2023

(54) REINFORCEMENT LEARNING FOR CREDIT LIMIT OPTIMIZER

(71) Applicant: International Business Machines Corporation, Armonk, NY (US)

(72) Inventor: Subarna Roy, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/458,724

(22) Filed: Aug. 27, 2021

(65) Prior Publication Data
US 2023/0065404 A1 Mar. 2, 2023

(51) Int. Cl.
*G06Q 40/00* (2023.01)
*G06Q 40/03* (2023.01)
*G06N 3/08* (2023.01)

(52) U.S. Cl.
CPC .............. *G06Q 40/03* (2023.01); *G06N 3/08* (2013.01)

(58) Field of Classification Search
CPC ......... G06Q 40/02; G06Q 40/025; G06N 3/08
USPC ................................................. 705/4, 35–45
See application file for complete search history.

(56) References Cited

U.S. PATENT DOCUMENTS

| | | | |
|---|---|---|---|
| 2004/0111363 A1 | 6/2004 | Trench | |
| 2009/0313163 A1 | 12/2009 | Wang | |
| 2017/0046780 A1* | 2/2017 | Cao | G06Q 40/025 |
| 2020/0357063 A1* | 11/2020 | Loddo | G06Q 40/025 |
| 2021/0049632 A1* | 2/2021 | He | G06Q 40/08 |

OTHER PUBLICATIONS

"FICO® Credit Line Optimizer | FICO", accessed on Apr. 22, 2021, 2 pages, <https://www.fico.com/en/latest-thinking/product-sheet/fico-credit-line-optimizer>.
Crossley, Neill, "FICO Lessons in Developing, Applying Decision Modelling Methods", FICO Labs, Dec. 20, 2013, 5 pages, <https://www.kdnuggets.com/2013/12/fico-lessons-developing-applying-decision-modelling-methods.html>.
Herasymovych et al., "Using reinforcement learning to optimize the acceptance threshold of a credit scoring model", Applied Soft Computing Journal 84 (2019) 105697, Available online Aug. 12, 2019, © 2019 Elsevier B.V., 16 pages.
Licari, Juan, "Determining the Optimal Dynamic Credit Card Limit", Moody's Analytics, Case Study Feb. 2021, 10 pages.
Mell et al., "The NIST Definition of Cloud Computing", NIST, National Institute of Standards and Technology, Special Publication 800-145, Sep. 2011, 7 pages.

(Continued)

*Primary Examiner* — Jessica Lemieux
*Assistant Examiner* — Mohammed H Mustafa
(74) *Attorney, Agent, or Firm* — Stephen R. Yoder

(57) ABSTRACT

A method and corresponding system to determine an optimized credit limit assignment using reinforcement learning techniques in order to maximize a reward function for a given bank. A reinforcement learning module is configured to use a set of user profiles and an associated set of risk profiles to determine an initial credit limit assignment. Based on this initial credit limit assignment, an updated set of user profiles and an associated set of updated risk profiles are generated. The reinforcement learning module can use these updated sets of user profiles and associated risk profile as inputs to determine an optimized credit limit assignment that maximizes the reward function for the given bank.

15 Claims, 6 Drawing Sheets

(56) References Cited

OTHER PUBLICATIONS

So, Mee Chi, "Optimizing credit limit policy by Markov Decision Process Models", University of Southampton, Thesis for the degree of Doctor of Philosophy Apr. 2009, 188 pages.

Sohn et al., "Optimization strategy of credit line management for credit card business", vol. 48, Aug. 2014, Elsevier, 2 pages. (Abstract Only).

* cited by examiner

REINFORCEMENT LEARNING FOR CREDIT LIMIT OPTIMIZER

BACKGROUND

The present invention generally relates to the field of machine learning, and more specifically to the use of reinforcement learning in the context of optimizing credit limits.

The Wikipedia entry for "Reinforcement learning" (as of May 23, 2021) states as follows: "Reinforcement learning (RL) is an area of machine learning concerned with how intelligent agents ought to take actions in an environment in order to maximize the notion of cumulative reward. Reinforcement learning is one of three basic machine learning paradigms, alongside supervised learning and unsupervised learning. Reinforcement learning differs from supervised learning in not needing labelled input/output pairs be presented, and in not needing sub-optimal actions to be explicitly corrected. Instead the focus is on finding a balance between exploration (of uncharted territory) and exploitation (of current knowledge). The environment is typically stated in the form of a Markov decision process (MDP), because many reinforcement learning algorithms for this context use dynamic programming techniques. The main difference between the classical dynamic programming methods and reinforcement learning algorithms is that the latter do not assume knowledge of an exact mathematical model of the MDP and they target large MDPs where exact methods become infeasible."

SUMMARY

According to an aspect of the present invention, there is a method, computer program product and/or system that performs the following operations (not necessarily in the following order): (i) receiving a plurality of user profiles, with each user profile including information indicative of a credit score, a credit utilization percentage, and/or an account balance of a user; (ii) determining a risk profile for each user profile of the plurality of user profiles; (iii) determining, by a reinforcement learning module, an initial credit limit assignment for each user based upon a corresponding user profile and the risk profile; (iv) responsive to the determination of the initial credit limit assignment, obtaining, by the reinforcement learning module, an updated plurality of user profiles and an updated risk profile for each user of the plurality of users, and (v) determining, by the reinforcement learning module, an optimized credit limit assignment for each user based upon a corresponding updated user profile and updated risk profile.

DETAILED DESCRIPTION

Figure 1:
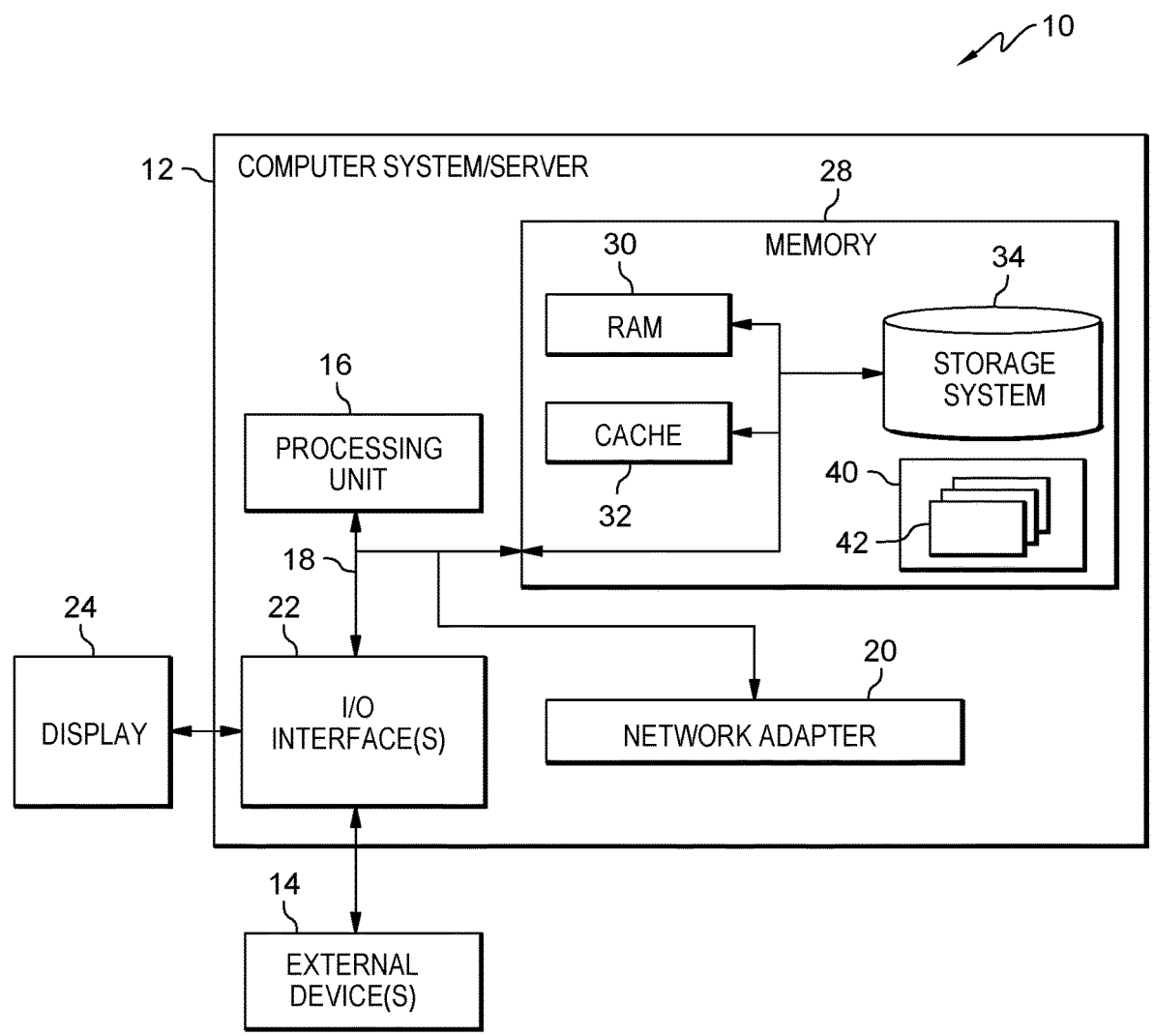
FIG. 1 depicts a cloud computing node used in a first embodiment of a system according to the present invention.

Some embodiments of the present invention are directed towards a method and corresponding system to determine an optimized credit limit assignment using reinforcement learning techniques in order to maximize a reward function for a given bank. In some embodiments, a reinforcement learning module is configured to use a set of user profiles and an associated set of risk profiles to determine an initial credit limit assignment. Based on this initial credit limit assignment, an updated set of user profiles and an associated set of updated risk profiles are generated. The reinforcement learning module can use these updated sets of user profiles and associated risk profile as inputs to determine an optimized credit limit assignment that maximizes the reward function for the given bank.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
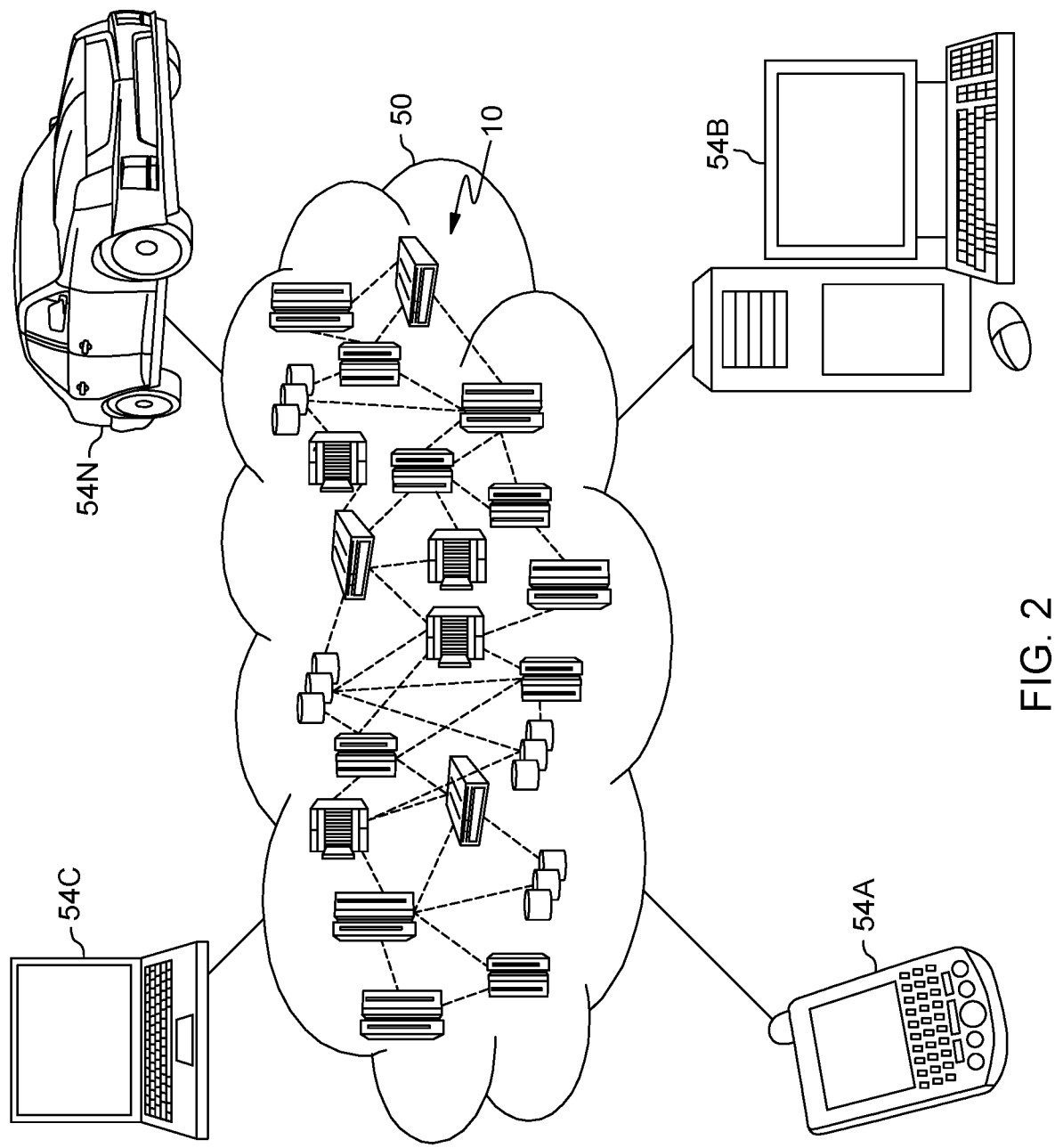
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
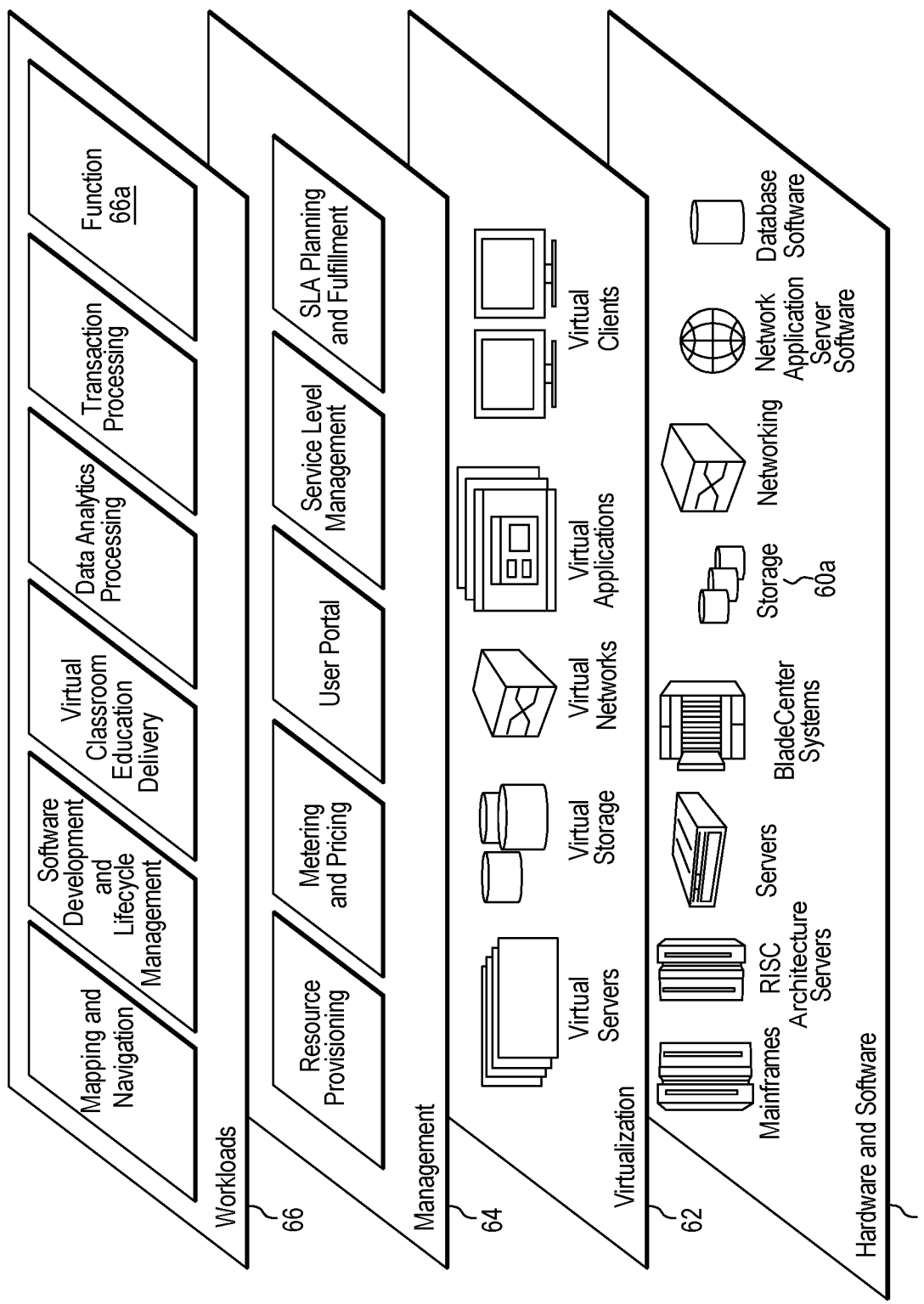
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components.

Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below.

Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 4:
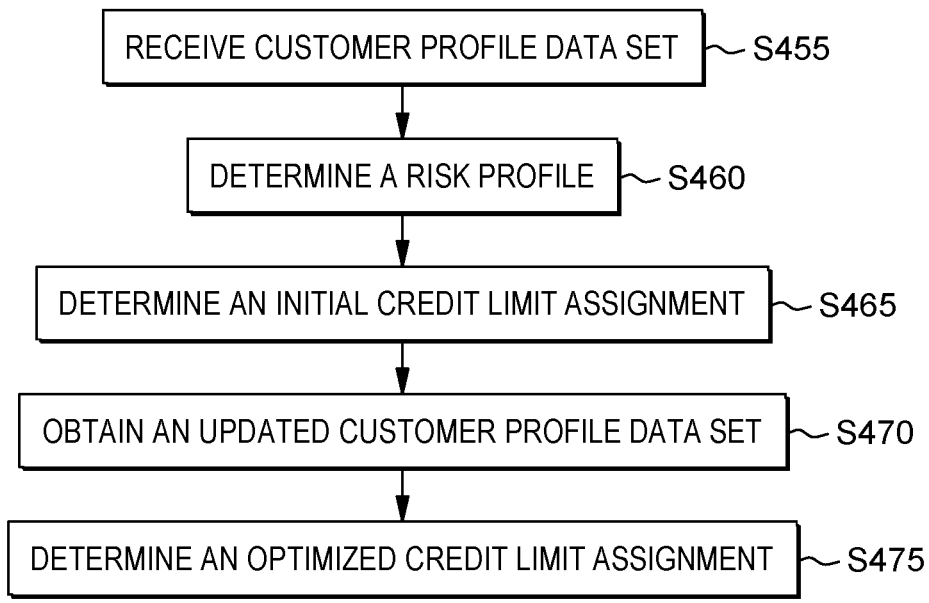
FIG. 4 is a flowchart showing a first embodiment method performed, at least in part, by the first embodiment system.
Figure 5:
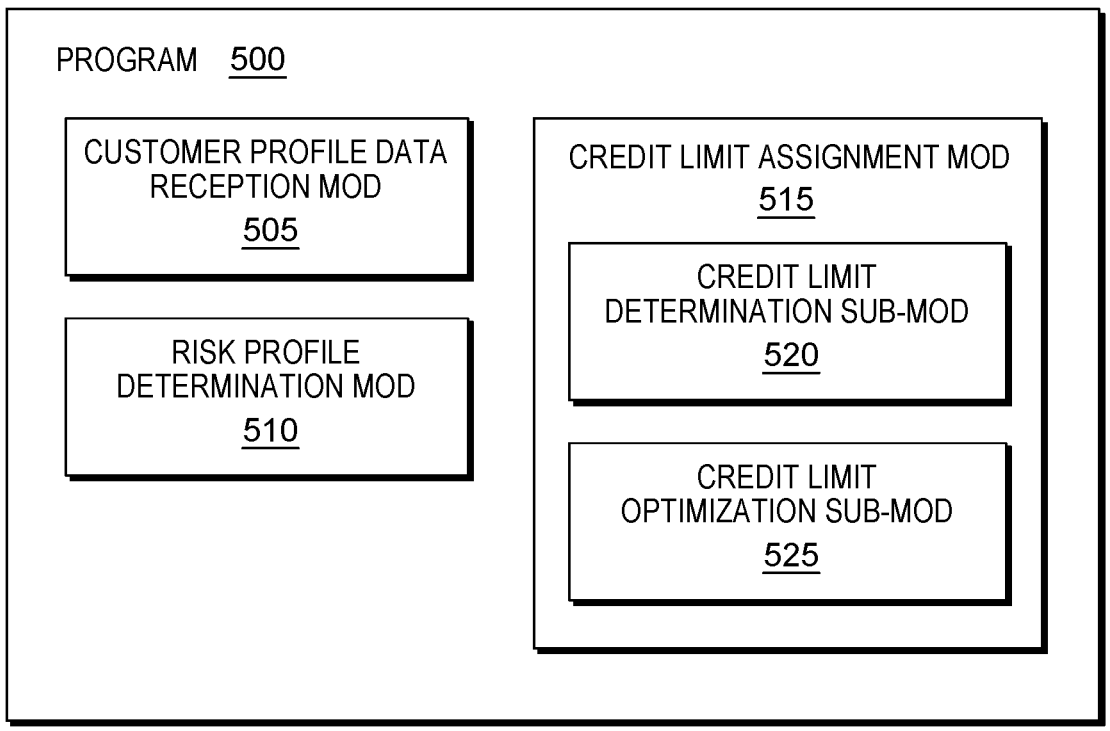
FIG. 5 is a block diagram showing a machine logic (for example, software) portion of the first embodiment system.

FIG. 4 shows flowchart 450 depicting a method according to the present invention. FIG. 5 shows program 40 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S455, where customer profile data reception module ("mod") 505 receives a customer profile data set. In some embodiments of the present invention, the customer profile data set includes several customer profiles, each including a credit score, a credit utilization percentage, and a bank account balance value for a particular customer. Alternatively, the profile data set does not include a current credit score and a credit utilization percentage.

Processing proceeds to operation S460, where risk profile determination mod 510 determines a risk profile for each customer profile that is received by customer profile data reception mod 505 (discussed in connection with operation S455, above). In some embodiments, the risk profile can include information that indicates how likely a given customer is to default on assigned credit. Alternatively, the risk profile can include information that indicates a predicted amount of profit or loss that can be gained by assigning a certain credit limit to the given customer.

Processing proceeds to operation S465, where credit limit determination sub-module ("sub-mod") 520 of credit limit assignment mod 515 determines an initial credit limit assignment for the given customer based upon a combination of the received customer profile and the risk profile that respectively corresponds to the given customer (discussed above in connection with operations S455 and S460). In some embodiments of the present invention, credit limit determination sub-mod 520 determines the initial credit limit assignment. This initial credit limit assignment is determined by using a reinforcement learning module (discussed further in Sub-Section III, below).

Processing proceeds to operation S470, where customer profile data reception mod 505 receives an updated customer profile data set that is based upon the initial credit limit assignment (discussed in connection with operation S465, above). Referring to the alternate embodiment mentioned in operation S455 where no credit score and credit utilization percentage is used, the update to the customer profile data set will include a credit score and a credit utilization percentage, which is determined based on recent activity of the customer after the initial credit limit is assigned. In this way, when a risk profile is determined for the customer profile, the risk profile can be determined with a greater degree of confidence. This ultimately leads to a better credit line adjustment data set that can be used as more accurate training data by the reinforcement learning module for determining future adjustments to a credit line assignment.

Processing finally proceeds to operation S475, where credit limit optimization sub-mod 525 of credit limit assignment mod 515 determines an optimized credit limit assignment. In some embodiments of the present invention, credit limit optimization mod 515 feeds the data contained in the updated customer profile data set into the reinforcement learning module to determine an optimized credit limit assignment for a given customer (or set of customers) in a manner that maximizes the Profit and Loss (P&L) for a bank.

III. FURTHER COMMENTS AND/OR EMBODIMENTS

Some embodiments of the present invention recognize the following facts, potential problems and/or potential areas for improvement with respect to the current state of the art: (i) credit line adjustments are an important tool banks typically adopt to maximize profit and minimize risk; (ii) most of the related research is currently concentrated on predicting the probability of default; (iii) existing lines of research on credit limit optimization use machine learning techniques (such as a decision tree and/or a genetic algorithm); (iv) FICO (originally, Fair, Isaac and Company) uses an action-effect model; (v) the drawback of a supervised machine learning model is that it does not have a feedback mechanism in place to understand how a given action has performed over time and is conditional on a given state in order to maximize reward or minimize loss; (vi) therefore, the credit limit assignment is not optimal.

In some instances in the current art, the action-effect model is used by FICO primarily to understand the best possible credit line assignment outcome from the point of view of a customer's probability of using a credit card (to its maximum credit limit) under various action scenarios. In this instance, the reward is not fed into the model as part of feedback mechanism. Additionally, the action-effect model is difficult to implement because it needs data on all possible actions that a bank might have taken for all customers at a given state. Because obtaining this kind of data may not be practical, the action-effect model uses various simulation tools that are based on existing business knowledge. This in turn may not have the desired accuracy.

Some embodiments of the present invention recognize the following facts, potential problems and/or potential areas for improvement with respect to the current state of the art: (i) models currently exist to predict the default behavior for a customer of various banking products (such as a credit card, mortgage, personal loan, etc.); (ii) models currently exist to assign and adjust a credit-limit for a customer based on the assumption that the adjustment of the credit limit is a one-time activity; and (iii) credit limit determinations are currently based only on expert judgement and/or semi-automated algorithms.

Some embodiments of the present invention may include one, or more, of the following features, characteristics and/or advantages: (i) credit limit adjustments are not a one-time activity; (ii) from time to time, credit limits are adjusted for a given customer based on the overall impact a customer has on the profit and loss (P&L) of the corresponding banking institution; (iii) currently models do not exist to incorporate the historical learning from a trial-and-error process for future credit line assignment/adjustment related decisions.

Some embodiments of the present invention recognize the following facts, potential problems and/or potential areas for improvement with respect to the current state of the art: (i) assignment and adjustment of the credit lines of card users is an important issue; (ii) it is essential to establish an optimized approach for credit card companies to identify the proper amount of credit to offer their customers; (iii) most of the related research concentrated on the prediction of credit card users default; (iv) related studies on credit line assignment looks at grouping customers in terms of default behaviour based on various parameters (such as risk scores); (v) in each cluster financial measures are forecasted and analysed to determine the amount of credit to assign to the cluster; and (vi) no data driven policy/rule currently exists to map a credit limit assignment and/or adjustment to a set of risk profiles that would optimize a given bank's P&L that spans a specified time period.

Some embodiments of the present invention may include one, or more, of the following features, characteristics and/or advantages: (i) specific credit line assignments or adjustments to every risk profile yields a profit or loss; (ii) the credit line assignment leads to change in the risk-profile which requires a readjustment to the credit line; (iii) this readjustment results in a change in a given bank's P&L, and therefore, the credit line adjustment is a trial-and-error process; (iv) this data is available with the given bank for each customer for a lifetime; (v) this data can be leveraged to assign and/or adjust a customer's credit line for a given risk-profile that optimizes the banks P&L spanning the customer's lifetime with the bank; and (vi) this requires incorporating the historical data of the trial-and-error process (typically done through machine learning techniques) in the credit line adjustment and noting the consequent changes in the customer's risk-profile and the bank's P&L.

Some embodiments of the present invention may include one, or more, of the following features, characteristics and/or advantages: (i) learns from an historical sequence of a trial-and-error process of credit line assignment (typically done through machine learning techniques); (ii) optimizes the profit for a given bank; (iii) compares all possible scenarios to come up with best offer/adjustment of a credit limit for a given customer; (iv) considers the historical feedback mechanism involved in the trial and error process to assign credit; and (v) creates a policy/rule to map credit limit assignments to a risk profiles that optimize the cumulative discounted profit spanning a given time period based on past experiential learning of the relationships between state, action, and reward in a sequential manner.

Some embodiments of the present invention provide for feedback based credit line management. This allows rewards to be explicitly modeled as an outcome of a state-action pair and produce an optimum policy for credit line management for each state based on past learning from sequential decision making that is reflected in the data. Typically, this leads to an automated feedback-based credit line management and consequently, credit risk management.

Some embodiments of the present invention provide for an automated line management. This automated line management introduces objectivity in credit-limit assignments and credit limit adjustments (throughout the credit life cycle). The result is that the scope of human errors/biases due to current subjective decision-making is reduced.

Some embodiments of the present invention provide for an agile system for line management. This system can be easily retrained with the latest information on the state-action and reward combination to update the optimal policy function, thereby introducing agility in risk management systems.

Embodiments of the present invention uses a reinforcement learning modelling framework to come up with an optimal policy function in order to assign and/or modify credit-limits based on sequential learning by a given bank.

There are several advantages to implementing embodiments of the present invention. These advantages include at least the following: (i) primarily related to credit line management that occurs after the acquisition of a customer, and therefore it is related to a credit line increase/decrease from an account management point of view; (ii) allows rewards to be explicitly modeled as an outcome of a state-action pair and comes up with an optimum policy for credit line management for each score-band in a sequential manner; (iii) leverages the deep Q network (DQN) architecture to determine the weights at each training iteration to be assigned to map the state action pair which is the cornerstone of optimal policy making; (iv) the model can be easily retrained with the latest information on state action and reward combination to modify the optimal policy function; and (v) the major difference between action effect model and the model proposed herein based on reinforcement learning is that the latter does not require observations on all possible actions by a given bank for a given customer at a given state.

In some embodiments, the underlying model within DQN architecture is a gradient boosting machine (GBM) model that sequentially updates the weights of the mapping between state and action and finally stops iterating when the associated loss is close to zero. Here, the optimal policy is based on experience replay or past learning from information related to a state action reward framework and not on any simulation that requires vast business knowledge.

Some embodiments of the present invention have discussed utilizing reinforcement learning (RL) techniques to ultimately determine a potential adjustment in a given user's credit limit. In order to understand how this determination is made, it is important to first understand a data gathering framework for a single use case.

In one example of a single use case, customer related data is gathered. The customer related data includes credit score/usage inquiries, credit utilization information, and credit score information. This customer related data can be stored in a relational database management system (RDMS) so that this data can be used as an initial training data set. After acquiring this customer related data, bank rules and policies are applied to determine whether a given customer's credit limit should be increased, decreased, or left unchanged. Once this determination is made, a customer profile database is updated to indicate and store the customer's credit limit determination. Additionally, a customer reward database is similarly updated to indicate and store information related to the profit or loss that the bank incurs as a result of their credit limit determination.

Now that a single use case has been established, it is important to discuss how RL techniques are used to make updated credit limit determinations for a given set of customers continually and dynamically. In some embodiments of the present invention, a neural net is used by a RL module to process the customer related data (that has been updated at least one time, as compared to the customer related data in the single use case which was not updated at this stage).

Similar to the single use case (discussed above), the RL techniques rely on a distributed computing environment that has a high reliability and availability. Typically, the RL techniques necessarily require the use of at least an enterprise level computing environment in order to successfully make credit limit determinations for the given set of customers. This enterprise level computing environment is discussed in greater detail in connection with Sub-Section I. Additionally, the enterprise level computing environment is necessarily required to operate and properly utilize embodiments of the present invention.

In some embodiments, the problem of optimal credit management is modeled as a Markov decision process (MDP) where the bank (acting as an agent) chooses actions over a sequence of time-steps to maximize the cumulative profit. Every reinforcement learning problem can defined as a tuple of five (5) elements (state, action, policy, reward and discount factor).

Some helpful definitions that are used to describe embodiments of the present invention are provided below:

State: A state set S is defined as a time sequence of score-bands and other related features for each customers of the bank six (6) months after acquisition. S(it) is the score-band and other related features for customer i at time point t.

Action: Action set A is defined as a time sequence of actions that the bank (agent) takes corresponding to a customer in a given state. A(it) is the action that bank takes when the customer is in S(it). Action can be credit line increase/decrease.

Reward: Reward set R is defined as a time sequence of rewards that the bank gains in terms of profit or loss based on a certain action. R(it) is the profit/loss corresponding to a given state and action.

Transition probability: Transition probability defines transition from S(it) to S(it+1) given a specific action.

Policy: A function that maps state and action-initialization done with random weights.

Given the historical MDP (state, action, reward, policy, and discount factor) the goal is to find an optimal policy that can maximize the banks profit.

Figure 6:
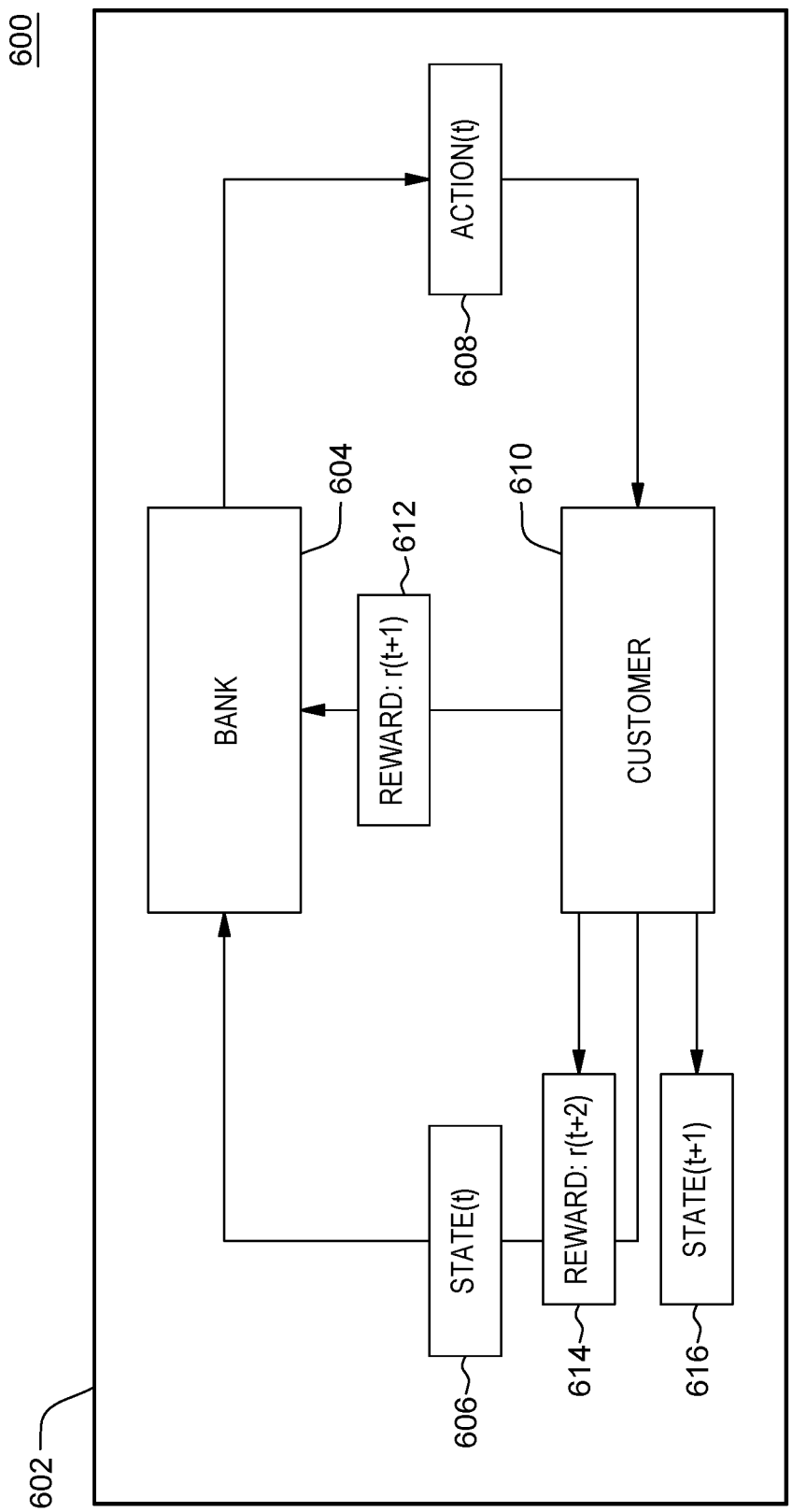
FIG. 6 is a block diagram showing information that is helpful in understanding embodiments of the present invention.

Block diagram 600 of FIG. 6 will be discussed below.

Block diagram 600 shows the following components: DQN Architecture 602, bank 604, state 606, action 608, customer 610, reward 612, reward 614, and state 616. Essentially, block diagram 600 shows: (i) the relationships between the state, action, and reward with respect to determining an optimal credit limit for a customer (or set of customers); and (ii) the methodology or process to determine the optimum credit limit policy that helps a given bank to maximize profit in the long run.

Figure 7:
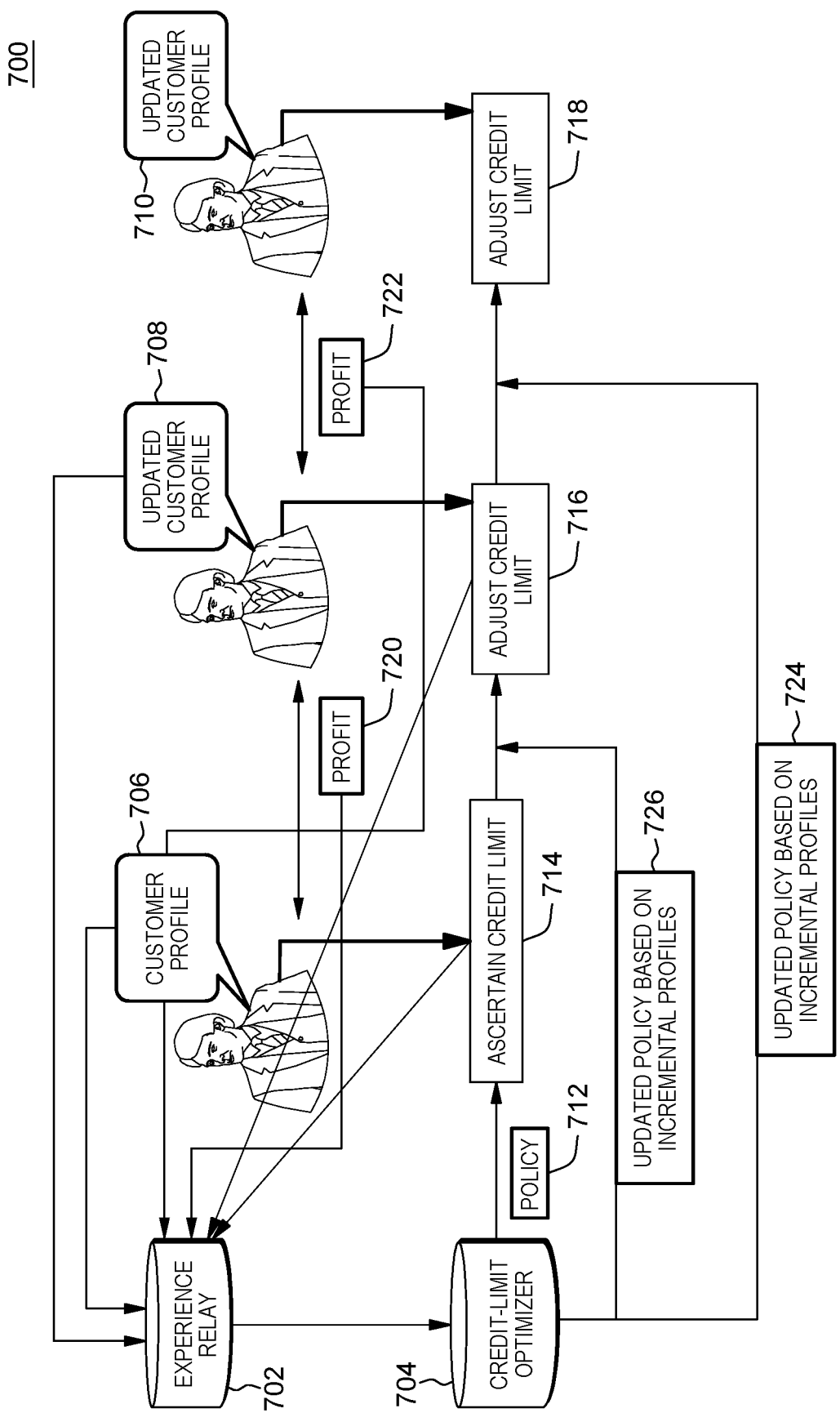
FIG. 7 is a system diagram showing information that is helpful in understanding embodiments of the present invention.

System diagram 700 of FIG. 7 will now be discussed below.

System diagram 700 has the following components: experience replay 702, credit limit optimizer module 704, customer profile 706, updated customer profile 708, updated customer profile 710, policy 712, credit limit determination module 714, credit limit adjustment module 716, credit limit adjustment module 718, profit 720, profit 722, updated policy 724, and updated policy 726.

In some embodiments, experience replay 702 includes the data (including customer profile data) that reinforcement learning algorithms runs in order to ultimately determine an optimal credit limit. This occurs when the data from experience replay 702 is fed into credit limit optimizer module 704. Throughout this process, customer profile information (such as customer profile 706, updated customer profile 708 and 710) are used to determine and/or adjust a credit limit in a manner that complies with a policy (such as policy 712) that is designed to optimize the credit limit that is ultimately assigned/readjusted. In some embodiments of the present invention, customer profile 706 and updated profiles 708 and 710 include information indicative of a customer's credit score, credit utilization percentage and a current account balance value. As this process continues to take in updated information (such as updated customer profile 708 and 710), the policies used to determine the credit limit are also updated based on these updated profiles (such as updated policy 724 and updated policy 726).

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
  receiving a plurality of user profiles, with each user profile including user-specific information indicative of a credit score, a credit utilization percentage, and/or an account balance;
  determining a risk profile for each user profile of the plurality of user profiles;

determining, by a reinforcement learning module, an initial credit limit assignment for each user based upon a corresponding user profile and the risk profile;

responsive to the determination of the initial credit limit assignment, obtaining, by the reinforcement learning module, an updated plurality of user profiles and updated risk profiles for each user of a plurality of users, with the updated plurality of user profiles and the updated risk profiles including a representation of a first state of each user, with the first state being a representation of a time sequence of credit score-bands for each user at specified points in time;

determining, by a deep Q network (DQN) architecture, a first set of weight scores for the first state, with the first set of weight scores indicating a credit limit risk that is used by the DQN architecture to train the reinforcement learning module, and with the first set of weight scores being determined by a series of sequential updates of weights by a gradient boosting machine (GBM) that operates within the DQN architecture;

determining, by the reinforcement learning module, an optimized credit limit assignment for each user based upon the updated plurality of user profiles and the updated risk profiles, with the reinforcement learning module utilizing an enterprise level distributed computing environment; and adjusting the initial credit limit assignment for each user of the plurality of users according to the optimized credit limit assignment.

2. The method of claim 1 wherein the optimized credit limit assignment is an increased credit limit compared to the initial credit limit assignment.

3. The method of claim 1 wherein the optimized credit limit assignment is a decreased credit limit compared to the initial credit limit assignment.

4. The method of claim 1 wherein the determination, by the reinforcement learning module, of the optimized credit limit assignment is done in a manner that optimizes a first reward function.

5. The method of claim 4 wherein the first reward function is a time sequence of profits or losses that a bank gains based upon the optimized credit limit assignment.

6. A computer program product (CPP) comprising:
a machine readable storage device; and
computer code stored on the machine readable storage device, with the computer code including instructions and data for causing a processor(s) set to perform operations including the following:
    receiving a plurality of user profiles, with each user profile including user-specific information indicative of a credit score, a credit utilization percentage, and/or an account balance,
    determining a risk profile for each user profile of the plurality of user profiles,
    determining, by a reinforcement learning module, an initial credit limit assignment for each user based upon a corresponding user profile and the risk profile,
    responsive to the determination of the initial credit limit assignment, obtaining, by the reinforcement learning module, an updated plurality of user profiles and updated risk profiles for each user of a plurality of users, with the updated plurality of user profiles and the updated risk profiles including a representation of a first state of each user, with the first state being a representation of a time sequence of credit score-bands for each user at specified points in time,
    determining, by a deep Q network (DQN) architecture, a first set of weight scores for the first state, with the first set of weight scores indicating a credit limit risk that is used by the DQN architecture to train the reinforcement learning module, and with the first set of weight scores being determined by a series of sequential updates of weights by a gradient boosting machine (GB M) that operates within the DQN architecture,
    determining, by the reinforcement learning module, an optimized credit limit assignment for each user based upon the updated plurality of user profiles and the updated risk profiles, with the reinforcement learning module utilizing an enterprise level distributed computing environment; and
    adjusting the initial credit limit assignment for each user of the plurality of users according to the optimized credit limit assignment.

7. The CPP of claim 6 wherein the optimized credit limit assignment is an increased credit limit compared to the initial credit limit assignment.

8. The CPP of claim 6 wherein the optimized credit limit assignment is a decreased credit limit compared to the initial credit limit assignment.

9. The CPP of claim 6 wherein the determination, by the reinforcement learning module, of the optimized credit limit assignment is done in a manner that optimizes a first reward function.

10. The CPP of claim 9 wherein the first reward function is a time sequence of profits or losses that a bank gains based upon the optimized credit limit assignment.

11. A computer system (CS) comprising:
a processor;
a machine readable storage device; and
computer code stored on the machine readable storage device, with the computer code including instructions and data for causing the processor(s) set to perform operations including the following:
    receiving a plurality of user profiles, with each user profile including user-specific information indicative of a credit score, a credit utilization percentage, and/or an account balance,
    determining a risk profile for each user profile of the plurality of user profiles,
    determining, by a reinforcement learning module, an initial credit limit assignment for each user based upon a corresponding user profile and the risk profile,
    responsive to the determination of the initial credit limit assignment, obtaining, by the reinforcement learning module, an updated plurality of user profiles and updated risk profiles for each user of a plurality of users, with the updated plurality of user profiles and the updated risk profiles including a representation of a first state of each user, with the first state being a representation of a time sequence of credit score-bands for each user at specified points in time,
    determining, by a deep Q network (DQN) architecture, a first set of weight scores for the first state, with the first set of weight scores indicating a credit limit risk that is used by the DQN architecture to train the reinforcement learning module, and with the first set of weight scores being determined by a series of sequential updates of weights by a gradient boosting machine (GB M) that operates within the DQN architecture, determining, by the reinforcement learning module, an optimized credit limit assignment for each user based upon the updated plurality of user profiles and the updated risk profiles, with the reinforcement learning module utilizing an enterprise level distributed computing environment; and adjusting the initial credit limit assignment for each user of the plurality of users according to the optimized credit limit assignment.

12. The CS of claim 11 wherein the optimized credit limit assignment is an increased credit limit compared to the initial credit limit assignment.

13. The CS of claim 11 wherein the optimized credit limit assignment is a decreased credit limit compared to the initial credit limit assignment.

14. The CS of claim 11 wherein the determination, by the reinforcement learning module, of the optimized credit limit assignment is done in a manner that optimizes a first reward function.

15. The CS of claim 14 wherein the first reward function is a time sequence of profits or losses that a bank gains based upon the optimized credit limit assignment.

* * * * *